April 6, 1965
J. D. MENG
3,177,418
ARMATURE CURRENT LIMITING SPEED CONTROL
SYSTEMS FOR ELECTRIC MOTORS
Filed Oct. 18, 1962
3 Sheets-Sheet 1
FIG_1
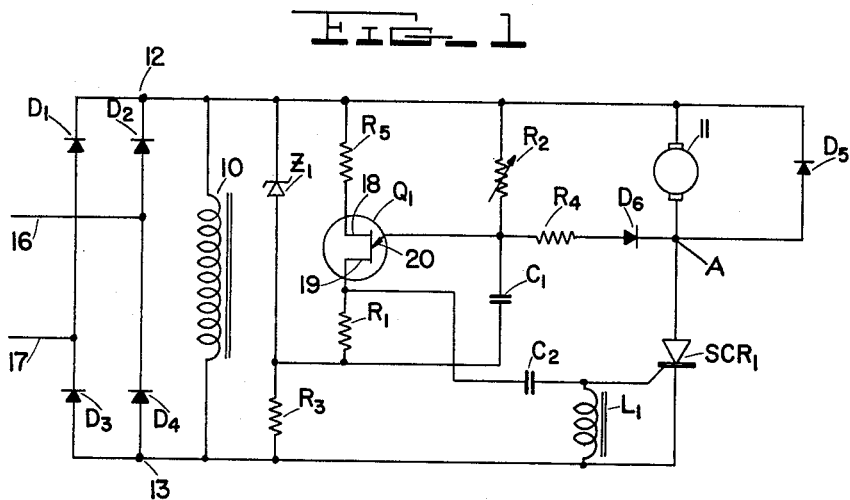
FIG_2
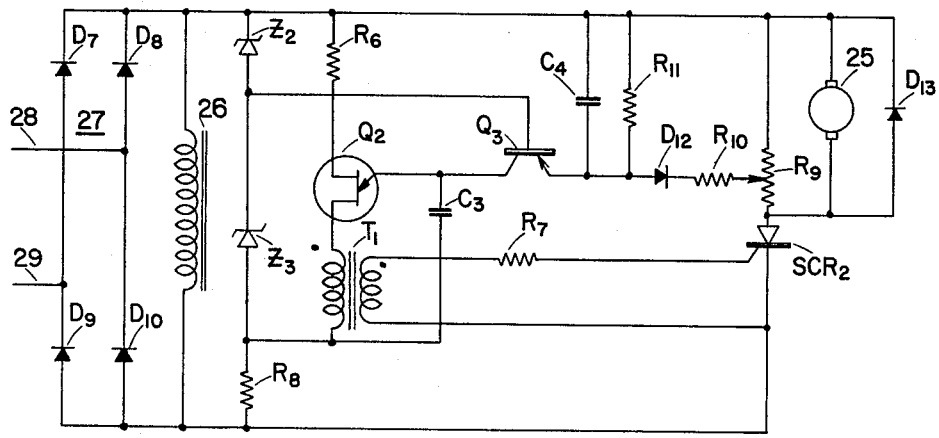
INVENTOR.
John D. Meng,
BY
Henry J. Marciniak
Attorney.

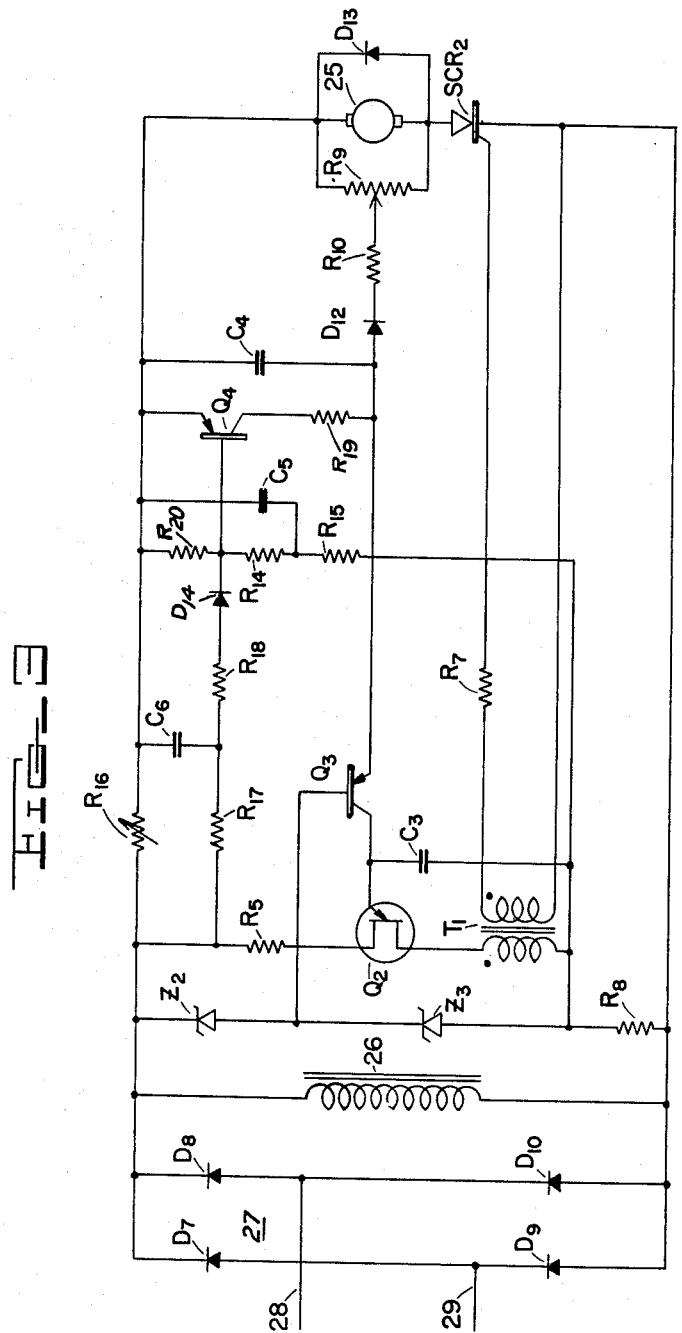

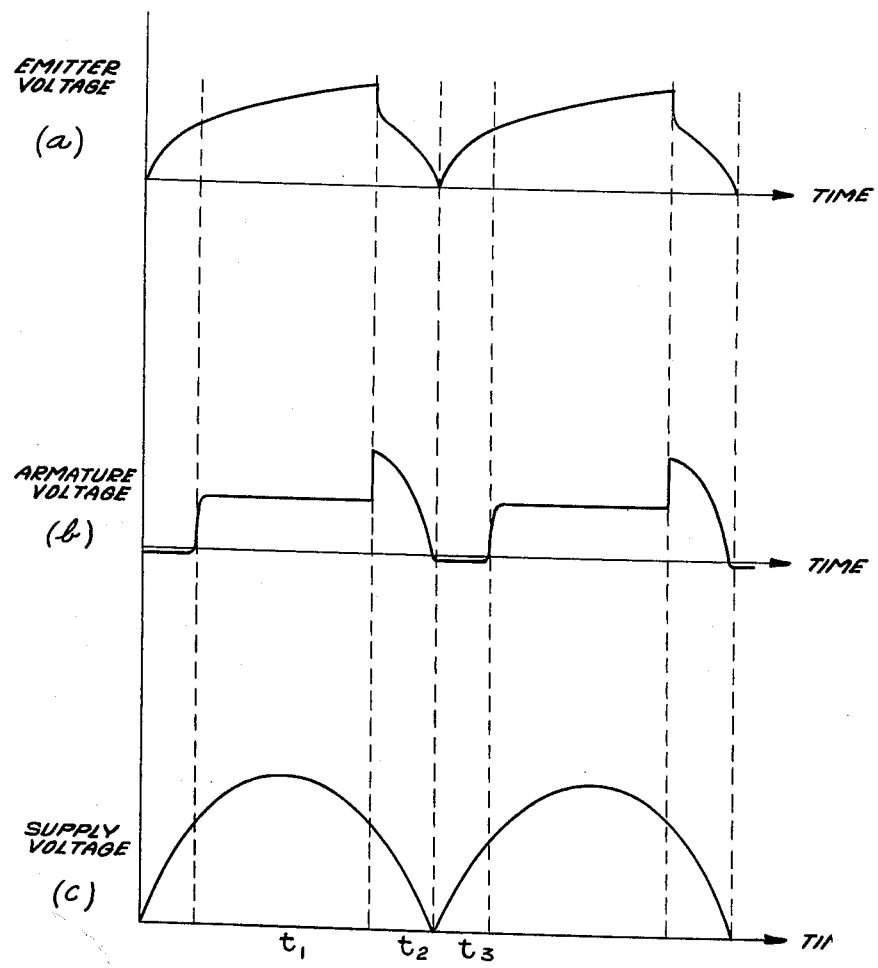

United States Patent Office 3,177,418
Patented Apr. 6, 1965

3,177,418
ARMATURE CURRENT LIMITING SPEED CONTROL SYSTEMS FOR ELECTRIC MOTORS
John D. Meng, Auburn, N.Y., assignor to General Electric Company, a corporation of New York
Filed Oct. 18, 1962, Ser. No. 231,368
9 Claims. (Cl. 318—331)

This invention relates to control systems and circuits for selectively controlling the speed of motors and more particularly to such systems and circuits for regulating and controlling the speed of direct current motors and for limiting the armature current under starting and operating conditions.

In many motor applications it is desirable to obtain good regulations of the motor's speed over a wide range of speeds and also to effectively limit the starting and operating current to some predetermined value. For example, where a motor is used to control a household appliance, it may be desirable that the speed be regulated over a wide range of speeds and the starting current and operating current be kept below the rating of a typical household fuse, such as a 15 ampere fuse. In applications where phase control circuits employing current sensitive solid state devices are used, it is particularly desirable that the current be effectively limited to prevent possible destruction of the devices by excessive currents.

It may be necessary in some applications that the motor be operated over a wide range of speeds with essentially constant speed-versus-torque characteristics. Further, the speed of the motor should be relatively insensitive to variations in line voltage and changes in torque. In all cases, it is desirable that the control system and its associated circuits be simple, reliable and inexpensive to manufacture.

Accordingly, it is a general object of the present invention to provide an improved control system and circuits for a motor.

It is another object of the present invention to provide an improved control system for a D.C. motor wherein the speed is regulated over a wide range.

A more specific object of the invention is to provide an improved control system and circuits for controlling the speed of a shunt wound D.C. motor wherein the starting current and the operating current are limited to a predetermined value.

It is still a further object of the present invention to provide an improved control system for operating a D.C. motor from a rectified alternating current supply employing phase control techniques to control the motor speed.

A further object of the invention is to provide an improved speed control system for a commutator motor employing simple and reliable static type of components.

It is another object of the invention to provide an improved control system for a shunt wound D.C. motor in which a phase control system employing at least one solid state control device, such as a silicon controlled rectifier, is used to control the power supplied to the armature.

In accordance with one form of my invention I have provided an improved control system and circuits for operating a motor from a direct current source at selected speeds. At least one solid state control device having a cathode, anode and gate, for example, a silicon controlled rectifier, is employed in a phase control circuit arrangement in which the charging rate of a capacitor determines the phase angle at which the control device is fired. A first unidirectional device is connected at one end thereof in circuit with the capacitor and at the other end to the anode of the control device and to the motor armature, the unidirectional device being poled to divert current from the capacitor.

According to one aspect of my invention, speed regulation is achieved by a circuit arrangement in which a signal indicative of the back electromotive force of the armature is applied at the first unidirectional device and the current diverted through the first unidirectional conducting device is functionally dependent on the back electromotive force of the armature. A second unidirectional conducting device is connected in circuit with the first device across the armature to provide a path for the inductive decay current in the armature when the control device is blocking current to the armature. When the second unidirectional conducting device conducts, the first device is reversely biased and blocks any diversion of current from the capacitor. Since the armature current increases with torque and also causes the inductive decay current of the armature to increase as the torque increases, the non-conduction interval of the first unidirectional conducting device increases to advance the firing angle of the control device and thereby increase the power supplied to the motor to compensate for torque changes.

In order to limit the starting current to a predetermined value, I have provided a time delay means, which includes at least a capacitor and an impedance element, to introduce a time delay after the circuit is initially energized before the capacitor is supplied with charging current. With such an arrangement it was found that the starting current could be limited to a desired safe value.

According to a further aspect of the invention I have provided a circuit means for stopping the supply of charging current to the capacitor when the running current of the motor exceeds a predetermined value. This circuit means includes a current limiting resistor connected in series circuit with the armature, an averaging network connected across the current sensing resistor and a diode connected in circuit with the base of a transistor placed in the path of the charging current supplied to the capacitor. The diode is rendered conducting to apply an opposing bias at the base of the transistor to switch it off and stop the flow of charging current when the running current of the motor reaches a predetermined value.

The subject matter which I regard as my invention is set forth in the appended claims. The invention itself, however, together with further objects, aspects and advantages thereof may be understood by referring to the following description taken in connection with the accompanying drawings in which:

FIGURE 1 is a schematic diagram of one form of the improved control arrangement of my invention;

FIGURE 2 is a schematic circuit diagram of another embodiment of my invention;

FIGURE 3 is a schematic circuit diagram of an embodiment of the invention wherein both running and starting current limit is incorporated in the circuit; and FIGURE 4 shows a plot of an arbitrary cycle of the unijunction transistor emitter voltage, the armature voltage and the supply voltage against time for an operating condition of the motor.

Referring now more specifically to the schematic circuit diagram shown in FIGURE 1, I have illustrated therein a D.C. shunt wound motor which is represented schematically by a field winding 10 and armature 11. The motor is operated from an unfiltered power source, which is provided at output terminals 12, 13 of a full wave bridge rectifier 15. The bridge rectifier 15 includes the four diodes $D_1$, $D_2$, $D_3$ and $D_4$ and is connected with a pair of input terminal leads 16, 17 which are adapted for connection to a suitable single phase alternating current supply (not shown).

The power supplied to the armature 11 is controlled by a solid state control device, a silicon controlled rectifier $SCR_1$ connected in series with the armature 11. The controlled rectifier $SCR_1$ is fired by a firing signal source which includes a unijunction transistor $Q_1$, a resistor $R_1$, a potentiometer $R_2$, and a charging capacitor $C_1$. The phase angle at which the controlled rectifier $SCR_1$ is fired is determined by the rate at which capacitor $C_1$ is charged to the peak point voltage of the unijunction transistor $Q_1$.

The unijunction transistor $Q_1$, used in the exemplifications of the invention, was a double base diode having three terminals or electrodes. Such a transistor is characterized by a stable negative resistance characteristic. Normally, between the base-one and base-two electrodes 19, 18 the unijunction transistor $Q_1$ exhibits the characteristics of an ordinary linear resistor. Provided the voltage at the emitter 20 is less than the peak point voltage of the unijunction transistor $Q_1$, the emitter 20 is reversely biased, and there is no appreciable current flow between the emitter 20 and the base-one electrode 19. When the emitter voltage exceeds the peak point voltage and the emitter current is greater than the current corresponding to the emitter peak point voltage, the unijunction transistor $Q_1$ becomes conducting. Thus, the phase angle at which the unijunction transistor $Q_1$ and the controlled rectifier $SCR_1$ are fired depends on the RC circuit, which includes the potentiometer $R_2$ and the charging capacitor $C_1$, and the control circuit to be hereinafter more fully described.

Although a unijunction transistor $Q_1$ was used in conjunction with the charging capacitor $C_1$, it will be understood that other solid state devices may be employed. For example, a Shockley diode, which is essentially a low power silicon controlled rectifier without a gate, may be used. Such a device is triggered into conduction when its forward voltage limit is exceeded.

The controlled rectifier $SCR_1$, used in the illustrated embodiments of my invention, was a solid state power device comprising a semiconductive body having four zones, the contiguous zones being of opposite conductivity type and defining at least three P-N junctions. An electrode is provided at the P-end zone, the N-end zone and an intermediate zone. The anode or the electrode at the P-end zone is represented in the drawings by the arrow symbol, the cathode or the electrode at the N-end zone is represented by a line drawn through the apex of the arrow symbol and the gate or the electrode at the intermediate zone is represented by a diagonal line extending from the cathode.

When the polarity of the voltage applied across the controlled rectifier $SCR_1$ is such that the outside P-layer or end zone is positive with respect to the outside N-layer or end zone, the two outside junctions are biased in a forward direction. While the inner junction is reversely biased, current will not flow through the rectifier except for a small leakage current. However, when a firing signal is applied at the gate, the controlled rectifier $SCR_1$ will conduct in a forward direction with a forward characteristic very similar to that of an ordinary rectifier.

Once the controlled rectifier $SCR_1$ is fired, it will continue to conduct even after the gate signal is removed. Conduction continues as long as the current through the controlled rectifier remains at a value greater than the holding current value. The controlled rectifier $SCR_1$ is turned off at the end of each half cycle since the current falls off to a substantially zero value. To insure that the current falls off to a zero value, a diode $D_5$ is connected across the armature 11 so that a path is provided for the inductive decay current of the armature when the controlled rectifier $SCR_1$ is in a blocking state. Also, as will be hereinafter more fully explained, diode $D_5$ during its conduction period insures that diode $D_6$ is reversely biased.

A capacitor $C_2$ provides A.C. coupling between the gate of the controlled rectifier $SCR_1$ and the signal source. The inductor $L_1$ connected across the gate and cathode attenuates the low frequency components of the gate signal to prevent misfiring of the silicon controlled rectifier $SCR_1$. Resistor $R_3$ is a current limiting resistor and maintains the power dissipation of the Zener diode $Z_1$ within a predetermined value. The resistor $R_5$ connected with the base-two electrode of transistor $Q_1$ compensates for temperature changes in the transistor $Q_1$.

The firing circuit or firing signal source is energized through a Zener diode $Z_1$ and the resistor $R_3$ so that a clipped or square wave voltage is applied across the RC circuit which includes the potentiometer $R_2$ and the charging capacitor $C_1$. Since a clipped or square wave voltage is applied across the RC circuit, the charging current to the capacitor $C_1$, and consequently, the slope of the capacitor voltage is very gradual as the voltage approaches the potential required to fire the unijunction transistor $Q_1$. This gradual slope of the capacitor voltage is preferred since considerable gain in the speed control circuit can be achieved. A small amount of current diverted through a resistor $R_4$ of diode $D_5$ of the control circuit resulted in appreciable changes in the power supplied to the armature 11.

The control circuit shown in FIGURE 1 was constructed to control the operation of a D.C. shunt motor rated at a half horsepower at 3,450 r.p.m. The following description of the circuit components is given by way of illustration and is not intended to limit the invention thereto:

| | |
|---|---|
| Resistor $R_1$ | 1,000 ohms, ½ watt, 10 percent. |
| Potentiometer $R_2$ | Variable resistor 100,000 ohms. |
| Resistor $R_3$ | 4,700 ohms, 2 watt, 10 percent. |
| Resistor $R_4$ | 100,000 ohms, ½ watt, 10 percent. |
| Charging capacitor $C_1$ | .05 microfarad, 50 volts. |
| Capacitor $C_2$ | .01 microfarad, 200 volts. |
| Controlled rectifier $SCR_1$ | General Electric C35B. |
| Diodes $D_1$, $D_2$, $D_3$, $D_4$, $D_5$ | General Electric A40B. |
| Unijunction transistor $Q_1$ | General Electric 1N1671A. |
| Zener diode $Z_1$ | 25 volt General Electric. |
| Diode $D_6$ | General Electric 1N536. |
| Inductor $L_1$ | 10 millihenries, having a D.C. resistance under 25 ohms. |

Referring now more particularly to FIGURE 2, I have shown therein an embodiment of the invention that is adaptable to application where speed regulation is desired at very low speeds. It will be noted that the control circuit shown in FIGURE 2 is similar in its basic speed control arrangement to the circuit shown in FIGURE 1.

The motor, which is represented schematically by an armature 25 and a shunt field winding 26, is operated at selected speeds by controlling the phase angle at which a solid state control device, the silicon controlled rectifier $SCR_2$, is fired. Speed regulation is achieved by controlling the current diverted from a charging capacitor $C_3$ in response to variations in the back electromotive force of the armature 25.

The control circuit is energized by a direct current source which is comprised of a full wave bridge rectifier 27 comprised of the four diodes $D_7$, $D_8$, $D_9$ and $D_{10}$. The input leads 28, 29 are adapted for connection to a single phase alternating current supply, such as a 120 volt, 60 cycle supply. The firing signal source for the controlled rectifier $SCR_2$ includes a unijunction transistor $Q_2$, a temperature compensating resistor $R_6$, the charging capacitor $C_3$ and a pulse transformer $T_1$, which couples the signal source with the gate of the controlled rectifier $SCR_2$. The resistor $R_7$ limits the peak gate current to the values specified for the controlled rectifier used in a particular application.

A pair of Zener diodes $Z_2$ and $Z_3$ were used not only to provide a clipped D.C. supply for the unijunction firing circuit but to supply bias to the transistor $Q_3$. A resistor $R_8$ was placed in series circuit with the Zener diodes $Z_2$, $Z_3$ to provide a voltage drop to make up the difference between the sum of the reverse breakdown voltages of the Zener diodes $Z_2$, $Z_3$ and the source voltage.

The transistor $Q_3$ used in the exemplification of the invention was a three terminal device of PNP type. It will be seen that the transistor $Q_3$ is connected as a common base amplifier. A voltage signal applied to the emitter of transistor $Q_3$ is amplified, and the amplified signal at the collector is supplied to the charging capacitor $C_3$. The feedback diode $D_{12}$ is poled to provide a path for current diverted from the capacitor $C_4$, and the signal across the capacitor $C_4$ is then amplified and fed to the charging capacitor $C_3$.

A fractional part of the back electromotive force of the armature 25 is applied through a voltage divider $R_9$ and the resistor $R_{10}$ at the diode $D_{12}$. The voltage divider $R_9$ serves as the speed control means. Resistor $R_{11}$ provides a limit on the charging current supplied to the capacitor $C_3$. An averaging capacitor $C_4$ averages the back electromotive force of the armature 25 when it is generated, and at lower speeds when diode $D_{12}$ is in a blocking state, this arrangement prevents the control circuit from being without an indication of speed.

In FIGURE 3 I have illustrated an embodiment of my invention in which the current limiting arrangement for the starting and operating conditions of the motor has been incorporated in the control circuit of FIGURE 2. It will be understood that this current limiting arrangement can also be used in conjunction with the control circuit shown in FIGURE 1. In order to simplify the description of the control circuit shown in FIGURE 3, elements which are common to both circuits shown in FIGURES 2 and 3 are given the same reference numerals. The starting current limiting network includes resistors $R_{14}$ and $R_{15}$ and a capacitor $C_5$. The running current limiting network includes a capacitor $C_6$, a current sensing resistor $R_{16}$, a resistor $R_{17}$ and a diode $D_{14}$.

The control circuit shown in FIGURE 3 is energized by the full wave bridge rectifier 27 which includes a pair of terminal leads 28, 29 adapted for connection to a suitable single phase alternating current. The silicon controlled rectifier $SCR_2$ is connected in series with the armature 25. As in the control circuit shown in FIGURE 2, the point in each half cycle at which the unijunction transistor $Q_2$ is fired depends upon the time required to charge capacitor $C_3$ to the peak point value of the transistor $Q_2$. The charging rate of the capacitor $C_3$ is functionally dependent on the back electromotive force of the armature 25 since the capacitor $C_4$ causes a signal indicative of the average back electromotive force to be supplied to the capacitor $C_3$ and since the current diverted through the resistor $R_{10}$ and the diode $D_{12}$ is controlled by the back electromotive force of the armature 25.

Current limiting during the operation condition is accomplished by sensing the current flow in the resistor $R_{16}$ connected in series with the armature 25. The voltage across the current sensing resistor $R_{16}$ is averaged by the resistor $R_{17}$ and the capacitor $C_6$. When the forward voltage drop of diode $D_{14}$ is exceeded, current flows through the resistor $R_{18}$ to oppose the bias current through resistor $R_{20}$. Thus, transistor $Q_4$ is turned off to stop the supply of current to the capacitor $C_3$. The network which includes the resistor $R_{14}$, the resistor $R_{15}$ and capacitor $C_{15}$ function to limit the starting current by providing a time delay before transistor $Q_4$ is switched on after the circuit is initially energized. Resistor $R_{19}$ sets the maximum value of the current supplied to the capacitor $C_3$.

Having reference now to the FIGURES 1 and 4, the operation of the control system will now be more fully described. When the full wave bridge 15 is energized by connecting leads 16, 17 to an alternating current supply, the charging capacitor $C_1$ begins to charge through the potentiometer $R_2$. Once the armature 11 begins to rotate at a selected speed, the instantaneous emitter, armature and input voltages for an arbitrarily selected cycle will be as shown in the waveforms (a), (b) and (c) respectively of FIGURE 4. It will be noted the input voltage or the output voltage of the bridge rectifier 27 cyclically drops to zero in each half cycle.

During the interval $t_1$ in each half cycle, it will be seen from the voltage waveform (b) that the armature voltage or back electromotive force is substantially constant. During this interval some of the charging current is being shunted from the capacitor $C_1$ through the resistor $R_4$ and the diode $D_6$. Also at the same time a certain amount of charging current is flowing into the capacitor $C_1$ as is evidenced by the gradual build-up of the emitter voltage during the interval $t_1$ as will be seen in waveform (a) of FIGURE 4. At the end of the interval $t_1$ the voltage across the charging capacitor $C_1$ reaches the peak point voltage of unijunction transistor $Q_1$, and a pulse of current is delivered through capacitor $C_2$ to the gate of the controlled rectifier $SCR_1$.

When the controlled rectifier $SCR_1$ is triggered, the armature 11 is energized. During the interval $t_2$ the controlled rectifier $SCR_1$ remains in a conducting state. Also, current is diverted from the changing capacitor $C_1$ through the resistor $R_4$, the diode $D_6$ and controlled rectifier $SCR_1$. At the end of the interval $t_2$, the input voltage of the control circuit falls off to zero as is shown in waveform (c), and the current in the controlled rectifier $SCR_1$ drops below the holding current value to turn it off.

Since the motor armature 11 contains a finite amount of inductance, the current flow through the armature does not instantly cease when the input voltage drops to zero. The inductive decay current is shunted through the free wheeling diode $D_5$. During the interval $t_3$ the voltage at point A is positive with respect to the anode of diode $D_6$ due to the forward drop of the free wheeling diode $D_5$. Consequently, diode $D_6$ is in a blocking state, and no current is diverted from the charging capacitor $C_1$. During this interval the charging rate of the charging capacitor is controlled by the variable resistor $R_2$. Further, it will be seen from voltage waveform (a) that during the interval $t_3$ the emitter voltage increases rapidly. During the succeeding interval $t_1$ the emitter voltage again increases gradually since the feedback diode $D_6$ is now forwardly biased and current is diverted from the charging capacitor $C_1$.

Speed regulation is achieved in the following manner: when the motor speed falls off below the selected speed as determined by setting of the potentiometer $R_2$, the back electromotive force of the motor decreases. This causes the current diverted from the charging capacitor $C_1$ through the diode $D_6$ to be decreased. Accordingly, the unijunction transistor $Q_1$ fires earlier in each half cycle, and more instantaneous power is delivered to the armature 11 to augment its speed. Conversely, when the motor speed increases above the selected speed, the back electromotive force and the current diverted from the charging capacitor $C_1$ increase in magnitude thereby causing the controlled rectifier $SCR_1$ to be fired later in the half cycle and cause the armature speed to reduce.

In addition to regulating speed, the control circuit arrangement of the invention also compensates for torque changes to render the motor speed relatively insensitive to torque changes. When the torque applied to the armature 11 is increased, the armature current also increases. Referring to the armature voltage waveform (a) shown in FIGURE 4, as the armature current increases in value, the time interval $t_3$ increases because the increase in the armature current causes the decay time for the inductive current to increase and prolong the non-conducting interval of diode $D_6$. Thus, the unijunction transistor $Q_1$ and the controlled rectifier $SCR_1$ are fired earlier in each half cycle and more power is delivered to the armature to compensate for the increased torque. From the foregoing description of the operation of control circuit, it will be apparent that a relatively few, simple and reliable components are employed to provide a means for correcting both speed and torque changes of the motor.

The control circuit shown in FIGURE 2 operates in essentially the same manner as the control circuit of FIGURE 1 except that an averaging network including the capacitor $C_4$ and a transistor $Q_2$ have been provided to improve the regulation characteristics of the basic control circuit at low speeds. It will be appreciated that when diode $D_6$ of the control circuit of FIGURE 1 is in a blocking state during the free wheeling interval $t_3$, the control circuit does not sense the speed of the armature 11. If it is desired to extend the range of speed control, the averaging network which includes the capacitor $C_4$ may be employed in conjunction with the transistor $Q_3$. The capacitor $C_4$ serves to average the armature voltage. Thus, a signal indicative of the average armature voltage is amplified by the transistor $Q_3$ and applied at the charging capacitor $C_3$ to control the phase angle of the controlled rectifier $SCR_2$. So long as a back electromotive force is generated by the armature 11, the unijunction firing circuit is provided with a signal indicative of the motor speed.

Referring now to FIGURE 3, speed control is achieved in essentially the same manner as in the control circuits of FIGURES 1 and 2. The back electromotive force of the armature 25 is sensed through the diode $D_{12}$, and current is diverted from the capacitor $C_4$. The signal across capacitor $C_4$ is amplified by the transistor $Q_3$ and fed to the charging capacitor $C_1$ to change the firing point of the unijunction transistor $Q_2$. Thus, the phase angle of the controlled rectifier $SCR_2$ is varied in response to variations in the back electromotive force or speed of the motor.

How the control system of FIGURE 3 operates to limit the armature current will now be more fully described. When the system is disconnected from the power source, it will be appreciated that capacitors $C_5$ and $C_6$ are discharged. Accordingly, when the circuit is initially energized, capacitor $C_5$ charges slowly through the resistor $R_{15}$ to provide a predetermined time delay before the transistor $Q_4$ is biased into conduction to supply changing current to capacitor $C_3$ thereby delaying the firing of the controlled rectifier $SCR_2$. As the charge on capacitor $C_5$ builds up, the conduction interval of the silicon controlled rectifier $SCR_2$ continues to increase until the transistor $Q_4$ saturates at which point the charging current is limited by the resistor $R_{19}$. With this arrangement the motor is allowed to come up to a speed where its back electromotive force can effectively hold the armature current at a predetermined value when the full line voltage is suddenly applied to the motor.

After the transistor $Q_3$ saturates and the motor is up to its selected speed, the running current limit portion of the control circuit comes into play. The current flow to the armature 25 is sensed by the current sensing resistor $R_{16}$. When the armature current reaches a predetermined limit, the forward voltage drop of the diode $D_{14}$, which is about 0.8 volt, is exceeded. Current will now flow through the resistor $R_{18}$ and diode $D_{14}$ to the base of the transistor $Q_4$. This current opposes the bias current flowing through resistor $R_{20}$. Consequently, transistor $Q_4$ is turned off thereby stopping the supply of charging current to the capacitor $C_3$. Thus, the conduction angle of the silicon controlled rectifier $SCR_2$ is reduced to limit the flow of armature current. When the armature current again falls below the predetermined limit, diode $D_{14}$ reverts to a blocking state and removes the opposing bias from the base of transistor $Q_3$. The transistor $Q_4$ is now driven to saturation by the bias applied through resistor $R_{20}$.

From the foregoing description of the various embodiments of my invention, it will be seen that speed regulation over a range of speeds can be achieved with a relatively simple circuit arrangement that utilizes static type of components. The control circuits render the control of the motor speed relatively insensitive to line voltage as well as torque variations. Further, the control circuits are adaptable to both half wave and full wave operation. The armature current may be readily limited at both start and operating conditions to make it possible to operate D.C. motors in applications where the current must be limited to a predetermined value.

Although in the aforedescribed embodiments of my invention a single gated solid state control device was used, it will be apparent that a pair of gated control devices may be connected in the legs of the bridge rectifier in applications where higher currents than can be handled by a single inexpensive device are involved. Further, although full wave rectifiers were used in the exemplification of the invention, it will be evident that the control circuit arrangement of my invention will effectively function in conjunction with a half wave rectified power source. Where such a source is employed, the control circuits of my invention may be adapted to function in substantially the same manner except that the control functions are carried out in each cycle rather than in each half cycle.

It will be understood that the control systems and various embodiments thereof described herein are intended as exemplifications of the invention and that the invention is not limited to such embodiments. Further, it will be apparent that many other modifications of the particular embodiments of the invention described herein may be made. It is so be understood, therefore, that I intend by the appended claims to cover all such modifications that fall within the true spirit and scope of my invention.

What I claim is new and desire to secure by Letters Patent of the United States is:

1. A control system for operating a motor from a pulsating power source at selected speeds, said control system comprising: a motor having an armature and a field winding, a phase control means adapted for connection to the power source and including a solid state control device having an anode, a cathode and a gate, a firing signal source for firing said control device at a selected phase angle, said signal source including a semiconductor device switchable from a high impedance condition to a low impedance condition and energized from said power source, a capacitor coupled with said semiconductor device, the voltage level on said capacitor controlling the switching of said semiconductor device from said high impedance condition to said low impedance condition, circuit means connecting said armature and said control device in series circuit and including a connection joining one side of the armature with the anode of said control device, a first unidirectional conducting device connected in circuit with said capacitor and with one end of said armature, said first unidirectional conducting device being poled to divert current from said capacitor and delay the firing angle of said control device, a second unidirectional conducting device connected in shunt with said armature and being poled to conduct the inductive decay current of the armature, said first unidirectional conducting device blocking current when said second unidirectional conducting device conducts current and said interval of conduction of said second device increasing as the armature current increases thereby compensating for torque changes by supplying increased power to the armature.

2. A control system for operating a motor from a pulsating direct current source at selected speeds, said control system comprising: an input means for connection to the direct current source, a solid state control device having a plurality of semiconducting zones forming more than two P-N junctions, means for connecting the end zones of the solid state device in series with the armature and the input means, said means including a connection joining the P-end zone of said device with one side of the armature, a firing circuit means for applying a forward bias at an intermediate junction of said solid state device to trigger the device into conduction and energize the armature, said firing circuit means including a semiconductor switching device switchable from a high impedance to a low impedance condition and connected in circuit with the pulsating direct current source, a capacitor coupled with said semiconductor switching device, said voltage level on said capacitor controlling the switching of said semiconductor device from said high impedance condition to said low impedance condition, the phase angle at which the solid state device is triggered into conduction being determined by the voltage level on said capacitor, a first diode means, a resistor connected in circuit with said first diode means, said serially connected first diode means and resistor being connected in circuit at one end with said P-end zone of the control device and said armature; and connected at the other end thereof with said capacitor to divert current therefrom, a second diode means connected in shunt with the armature to provide a path for the inductive decay current of said armature when said solid state control device is switched to a blocking state, the current diverted from the charging capacitor through said first diode means being functionally dependent upon the back electromotive force of the armature, and said first diode means blocking current when the second diode means is in a conducting state.

3. A control circuit for varying the power supplied to the armature of a motor from a pulsating source, said control circuit comprising: an input means for connection to the direct current source, a solid state control device having a plurality of semiconducting zones forming more than two P-N junctions, means for connecting the end zones of the first device in series with the armature across the input leads, said means including a connection between the end P-zone of the first device and the one side of the armature, a firing signal source for applying a forward bias at an intermediate junction of the said control device at a selected phase angle, said signal source including a semiconductor switching device switchable from a high impedance to a low impedance condition and connected in circuit with the pulsating direct current source, a capacitor coupled with said semiconductor device, said voltage level on said capacitor controlling the switching of said semiconductor device from said high impedance condition to said low impedance condition, the voltage level on said capacitor determining said phase angle at which said control device is fired, a transistor having an emitter, collector and base, circuit means connecting said emitter and collector of said transistor in circuit with said capacitor and said input means to control the charging current supplied to said capacitor, a time delay means connected in circuit with the base of said transistor and said input means to delay the switching of said transistor after said input means is initially energized to thereby limit the starting current to a predetermined value, means for applying an opposing bias at the base of said transistor when the armature running current reaches a predetermined value, a first diode means connected in circuit with said control device and said capacitor, said first diode means being pole for diverting current from said capacitor, the current diverted from said capacitor being functionally dependent on the back electromotive force of the armature, and a second diode means connected in shunt with the armature, said first diode means being in a blocking state when said second diode means is in a conducting state.

4. The control circuit set forth in claim 3 wherein said means for applying an opposing bias at the base of said transistor includes a diode, a current sensing resistor for connection in circuit with the armature and an averaging network connected across said current sensing network and in circuit with said diode, said diode being rendered conucting to apply an opposing bias at the base of said transistor to switch it off when the running current reaches said predetermined value.

5. A control system for operating a motor from a pulsating power source at selected speeds, said control system comprising: a phase control means adapted for connection to the power source and including at least one solid state control device for controlling the power to the motor, said control device including an anode, a cathode and a gate, a firing signal source including a solid state switching device switchable from a high to a low impedance condition and connected in circuit with the pulsating power source, a capacitor coupled with said solid state switching device, said voltage level on said capacitor controlling the switching of said solid state switching device from said high impedance condition to said low impedance condition, said firing signal source coupled with the gate of the control devce for firing said control device at a selected phase angle, the voltage level of said capacitor determining said phase angle at which said control device is fired, a first unidirectional device connected in circuit with said capacitor of the signal source and in circuit with the anode of said control device and the armature to provide a path for current diverted from said capacitor, a second unidirectional conducting device connected across the armature to provide a path for the inductive decay current of said armature when said control device is switched to a blocking state, delay means connected in circuit with said capacitor for delaying the current supplied thereto when the circuit is initially energized thereby to limit the starting current of the motor to a predetermined value and means for stopping the supply of current to said capacitor when the running current of the motor reaches a predetermined value, the current diverted from the capacitor through said first unidirectional conducting device being functionally dependent upon the back electromotive force of said armature, and said first unidirectional conducting device being reversely biased when said second unidirectional conducting device is in a conducting state.

6. The control system set forth in claim 5 wherein said delay means includes a capacitor and a resistive element, the delay being determined by time required to charge said capacitor.

7. A control system for operating a motor from a pulsating source at a selected range of speeds, said control system comprising: a motor having an armature and a shunt winding, an input means for connection to the direct current source, a solid state control device for controlling the power supplied to the armature, and said control device including at least an anode, a cathode and a gate, a unijunction firing circuit coupled with the gate of said control device and including a unijunction transistor having a base-one, a base-two and an emitter electrode and including a serially connected charging capacitor and resistor connected in circiut with said emitter electrode, across said pulsating source, said base-one and base-two electrodes connected in circuit across the pulsating direct current source, circuit means connecting said armature and said control device in series circuit relation and including connections joining one side of the armature with the anode of said control device, a first unidirectional conducting device connected in circuit with the anode of said control device and said charging capacitor, said first unidirectional conducting device being poled to divert current from said charging capacitor and delay the firing angle of said control device when current is diverted, a second unidirectional conducting device connected in shunt with said armature to provide a path for the inductive decay current in said armature when said control device is switched to a blocking state, the amount of current diverted through said first unidirectional conducting device being dependent on the back electromotive force of the armature and said first unidirectional conducting device blocking current when the second unidirectional device is in a conducting state.

8. The control system set forth in claim 7 wherein a delay circuit means is connected in circuit with said charging capacitor to provide a delay before current is supplied to said charging capacitor after the circuit is initially energized thereby to limit the starting current to a predetermined value.

9. A control system for operating a motor from a pulsating source at selected speeds, said control system comprising: an input means for connection to the direct current source, a solid state control device having an anode, a cathode and a gate, a firing signal source for applying a firing signal at the gate of said device at a selected phase angle, said signal source including a solid state switching device switchable from a high to a low impedance condition and connected in circuit across the pulsating source, a capacitor coupled with said solid state switching device, said voltage level on said capacitor controlling the switching of said switching device from said high impedance condition to said low impedance condition, said phase angle of said signal being dependent on the charging rate of said capacitor, circuit means connecting said armature and said control device in series circiut and including connections joining one side of the armature with the anode of said control device, a first unidirectional conducting device having an anode and a cathode, said anode connected in circuit with said capacitor and said cathode connected in circut with the armature a voltage dividing means for applying a proportional part of the armature back electromotive force at the cathode of said first unidirectional conducting device, the current diverted through said first unidirectional conducting device being dependent on said back electromotive force, an amplifying means connected in circuit with said anode of said first unidirectional conducting device and said capacitor, an averaging capacitor connected in circuit with said amplifying means and said input means, said amplifying means amplifying the signal across said averaging capacitor to provide control at relatively low armature speeds when said first unidirectional conducting device is in a blocking state, and a second unidirectional conducting device connected across said armature to provide a path for the inductive decay current in the armature when said control device is switched into a blocking state.

References Cited by the Examiner

UNITED STATES PATENTS

| | | | |
|---|---|---|---|
| Re. 25,203 | 7/62 | Momberg | 318—246 |
| 2,656,500 | 10/53 | Dee | 318—331 |
| 3,064,174 | 11/62 | Dinger | 318—331 |

OTHER REFERENCES

Publication: GE SCR Manual, 2d ed., Auburn, N.Y., 1961, pages 106–108.

ORIS L. RADER, *Primary Examiner.*